(12) United States Patent
Matsuo

(10) Patent No.: US 12,719,078 B2
(45) Date of Patent: Aug. 25, 2026

(54) SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

(71) Applicant: ZEON CORPORATION, Tokyo (JP)

(72) Inventor: Yusaku Matsuo, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 690 days.

(21) Appl. No.: 17/997,144

(22) PCT Filed: May 25, 2021

(86) PCT No.: PCT/JP2021/019877
§ 371 (c)(1),
(2) Date: Oct. 26, 2022

(87) PCT Pub. No.: WO2021/241599
PCT Pub. Date: Dec. 2, 2021

(65) Prior Publication Data

US 2023/0261255 A1 Aug. 17, 2023

(30) Foreign Application Priority Data

May 29, 2020 (JP) ................................. 2020-094689

(51) Int. Cl.
*H01M 10/0562* (2010.01)
*H01M 4/62* (2006.01)
*H01M 10/0525* (2010.01)

(52) U.S. Cl.
CPC ....... *H01M 10/0562* (2013.01); *H01M 4/622* (2013.01); *H01M 4/624* (2013.01); *H01M 10/0525* (2013.01); *H01M 2300/0068* (2013.01)

(58) Field of Classification Search
CPC ....... H01M 10/0562; H01M 10/02525; H01M 4/622; H01M 4/624; H01M 2300/0068; H01M 10/0525
See application file for complete search history.

(56) References Cited

U.S. PATENT DOCUMENTS 9,276,263 B2 3/2016 Yoshida et al.
10,044,026 B2 8/2018 Sonobe et al.
(Continued)

FOREIGN PATENT DOCUMENTS

CN 107078299 A 8/2017
JP 2012104406 A 5/2012
(Continued)

OTHER PUBLICATIONS

May 24, 2024, the Extended European Search Report issued by the European Patent Office in the corresponding European Patent Application No. 21813057.3.
(Continued)

*Primary Examiner* — Osei K Amponsah
(74) *Attorney, Agent, or Firm* — KENJA IP LAW PC

(57) ABSTRACT

Provided is a slurry composition for an all-solid-state secondary battery with which it is possible to form a solid electrolyte-containing layer that can cause an all-solid-state secondary battery to display excellent output characteristics and cycle characteristics. The slurry composition contains a solid electrolyte, a particulate polymer, and an organic solvent. The particulate polymer has a core-shell structure including a core portion and a shell portion at least partially covering an outer surface of the core portion. A polymer forming the core portion has a glass-transition temperature of not lower than −60° C. and not higher than −10° C., and a polymer forming the shell portion has a glass-transition temperature of not lower than 15° C. and not higher than 100° C. The polymer forming the shell portion includes a
(Continued)

nitrogen functional group-containing monomer unit in a proportion of not less than 10 mass % and not more than 90 mass %.

7 Claims, 1 Drawing Sheet

(56) References Cited

U.S. PATENT DOCUMENTS

| | | | | |
|---|---|---|---|---|
| 10,062,923 | B2 | 8/2018 | Mimura et al. | |
| 10,862,128 | B2 | 12/2020 | Maeda et al. | |
| 2014/0127579 | A1* | 5/2014 | Yoshida | H01M 4/621 429/306 |
| 2016/0365604 | A1* | 12/2016 | Mimura | H01M 10/0562 |
| 2017/0244095 | A1* | 8/2017 | Sonobe | C08F 220/06 |
| 2021/0305573 | A1* | 9/2021 | Arai | H01M 4/131 |

FOREIGN PATENT DOCUMENTS

| | | | |
|---|---|---|---|
| JP | 2015159067 | A | 9/2015 |
| WO | 2011068215 | A1 | 6/2011 |
| WO | 2012173089 | A1 | 12/2012 |
| WO | 2016067633 | A1 | 5/2016 |
| WO | 2018012380 | A1 | 1/2018 |
| WO | 2019208419 | A1 | 10/2019 |

OTHER PUBLICATIONS

Aug. 24, 2021, International Search Report issued in the International Patent Application No. PCT/JP2021/019877.

Nov. 17, 2022, International Preliminary Report on Patentability issued in the International Patent Application No. PCT/JP2021/019877.

* cited by examiner

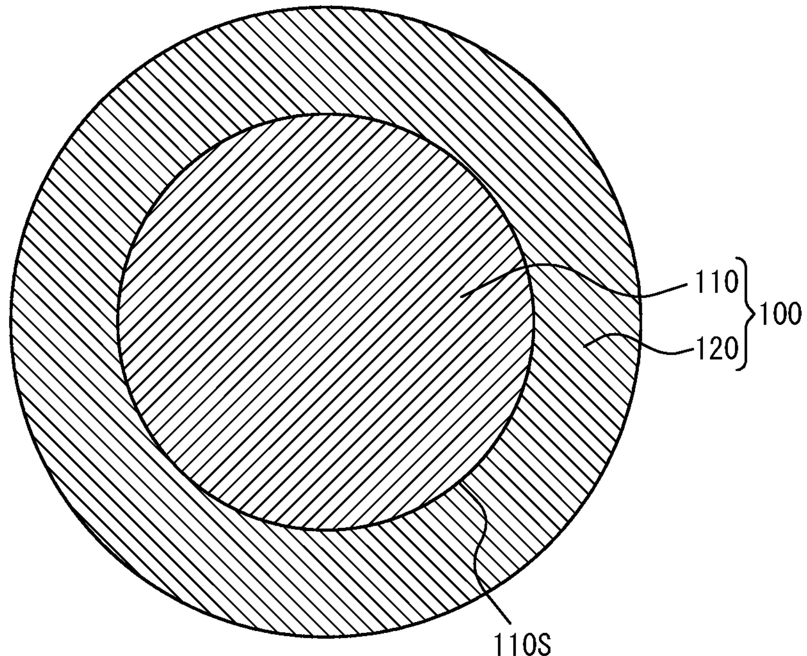
110
100
120
110S

SLURRY COMPOSITION FOR ALL-SOLID-STATE SECONDARY BATTERY, SOLID ELECTROLYTE-CONTAINING LAYER, AND ALL-SOLID-STATE SECONDARY BATTERY

TECHNICAL FIELD

The present disclosure relates to a slurry composition for an all-solid-state secondary battery, a solid electrolyte-containing layer, and an all-solid-state secondary battery.

BACKGROUND

Demand for secondary batteries such as lithium ion secondary batteries has been increasing in recent years for various applications such as mobile information terminals, mobile electronic devices, and other mobile terminals, and also domestic small power storage devices, motorcycles, electric vehicles, and hybrid electric vehicles. The widespread use of secondary batteries in such applications has been accompanied by demand for further improvement of secondary battery safety.

All-solid-state secondary batteries in which a solid electrolyte is used instead of an organic solvent electrolyte having high flammability and high risk of catching fire upon leakage are attracting interest as secondary batteries having high safety.

An all-solid-state secondary battery includes a positive electrode, a negative electrode, and a solid electrolyte layer that is located between the positive electrode and the negative electrode. An electrode (positive electrode or negative electrode) of an all-solid-state secondary battery may be formed by, for example, applying a slurry composition containing an electrode active material (positive electrode active material or negative electrode active material), a binder, and a solid electrolyte onto a current collector, and then drying the applied slurry composition to form an electrode mixed material layer (positive electrode mixed material layer or negative electrode mixed material layer) on the current collector. A solid electrolyte layer of an all-solid-state secondary battery may be formed by, for example, applying a slurry composition containing a binder and a solid electrolyte onto an electrode or a releasable substrate, and then drying the applied slurry composition.

Patent Literature (PTL) 1 and 2, for example, propose using a slurry composition for an all-solid-state secondary battery that contains a particulate polymer having a core-shell structure as a binder.

CITATION LIST

Patent Literature

PTL 1: JP2015-159067A
PTL 2: WO2012/173089A1

SUMMARY

Technical Problem

However, there is room for improvement of a conventional slurry composition for an all-solid-state secondary battery such as described above in terms of causing an all-solid-state secondary battery to display excellent output characteristics and cycle characteristics through a layer containing a solid electrolyte (hereinafter, referred to as a "solid electrolyte-containing layer"), such as a solid electrolyte layer or electrode mixed material layer, that is formed using the slurry composition.

Accordingly, one object of the present disclosure is to provide a slurry composition for an all-solid-state secondary battery with which it is possible to form a solid electrolyte-containing layer that can cause an all-solid-state secondary battery to display excellent output characteristics and cycle characteristics.

Another object of the present disclosure is to provide a solid electrolyte-containing layer that can cause an all-solid-state secondary battery to display excellent output characteristics and cycle characteristics.

Yet another object of the present disclosure is to provide an all-solid-state secondary battery that has excellent output characteristics and cycle characteristics.

Solution to Problem

The inventor conducted diligent investigation with the aim of solving the problem set forth above. The inventor made a new discovery that by forming a solid electrolyte-containing layer using a slurry composition that contains a solid electrolyte, a particulate polymer having a core-shell structure, and an organic solvent, and in which a core portion and a shell portion of the particulate polymer are formed of specific polymers, it is possible to cause an all-solid-state secondary battery to display excellent output characteristics and cycle characteristics. In this manner, the inventor completed the present disclosure.

Specifically, the present disclosure aims to advantageously solve the problem set forth above, and a presently disclosed slurry composition for an all-solid-state secondary battery comprises a solid electrolyte, a particulate polymer, and an organic solvent, wherein the particulate polymer has a core-shell structure including a core portion and a shell portion at least partially covering an outer surface of the core portion, a polymer forming the core portion has a glass-transition temperature of not lower than −60° C. and not higher than −10° C., a polymer forming the shell portion has a glass-transition temperature of not lower than 15° C. and not higher than 100° C., the polymer forming the shell portion includes a nitrogen functional group-containing monomer unit, and the nitrogen functional group-containing monomer unit is included in the polymer forming the shell portion in an amount of not less than 10 mass % and not more than 90 mass % when all repeating units of the polymer forming the shell portion are taken to be 100 mass %. By forming a solid electrolyte-containing layer using a slurry composition that contains, as a binder, a particulate polymer having a core-shell structure in which the glass-transition temperatures of a polymer forming the core portion and a polymer forming the shell portion (hereinafter, also referred to respectively as the "core polymer" and the "shell polymer") are within the ranges set forth above and in which the proportional content of a nitrogen functional group-containing monomer unit in the shell polymer is within the range set forth above, it is possible to cause an all-solid-state secondary battery to display excellent output characteristics and cycle characteristics.

Note that the "glass-transition temperature" of a polymer referred to in the present disclosure can be measured by a method described in the EXAMPLES section.

Moreover, the phrase "includes a monomer unit" as used in the present disclosure means that "a polymer obtained using that monomer includes a repeating unit derived from the monomer". Furthermore, in the present disclosure, the amount of a specific repeating unit in a polymer can be measured by a nuclear magnetic resonance (NMR) method such as $^{1}$H-NMR or $^{13}$C-NMR.

In the presently disclosed slurry composition for an all-solid-state secondary battery, the shell portion preferably constitutes a proportion of not less than 10 mass % and not more than 25 mass % among a total of the core portion and the shell portion. When the proportion constituted by the shell portion among the total of the core portion and the shell portion is within the range set forth above, a solid electrolyte-containing layer can be sufficiently densified even with a low pressing pressure (i.e., pressability of a solid electrolyte-containing layer improves). In addition, peel strength of an obtained solid electrolyte-containing layer can be increased while also further improving output characteristics and cycle characteristics of an all-solid-state secondary battery.

In the presently disclosed slurry composition for an all-solid-state secondary battery, it is preferable that the particulate polymer includes a cross-linkable monomer unit, and the cross-linkable monomer unit is included in the particulate polymer in an amount of not less than 0.1 mass % and less than 2.0 mass % when all repeating units of the particulate polymer are taken to be 100 mass %. When the proportional content of a cross-linkable monomer unit in the particulate polymer is within the range set forth above, output characteristics and cycle characteristics of an all-solid-state secondary battery can be further improved.

The presently disclosed slurry composition for an all-solid-state secondary battery preferably further comprises an electrode active material. By using the slurry composition for an all-solid-state secondary battery containing an electrode active material, it is possible to form an electrode mixed material layer well.

The presently disclosed slurry composition for an all-solid-state secondary battery preferably further comprises a conductive material. When the slurry composition for an all-solid-state secondary battery containing an electrode active material also contains a conductive material, electrical resistance of an electrode mixed material layer formed using the slurry composition can be reduced well, and output characteristics and cycle characteristics can be further improved.

Moreover, the present disclosure aims to advantageously solve the problem set forth above, and a presently disclosed solid electrolyte-containing layer is formed using any one of the slurry compositions for an all-solid-state secondary battery set forth above. A solid electrolyte-containing layer that is formed using the slurry composition for an all-solid-state secondary battery set forth above can cause an all-solid-state secondary battery to display excellent output characteristics and cycle characteristics.

Furthermore, the present disclosure aims to advantageously solve the problem set forth above, and a presently disclosed all-solid-state secondary battery comprises the solid electrolyte-containing layer set forth above. An all-solid-state secondary battery that includes the solid electrolyte-containing layer set forth above has excellent cell characteristics such as output characteristics and cycle characteristics.

Advantageous Effect

According to the present disclosure, it is possible to provide a slurry composition for an all-solid-state secondary battery with which it is possible to form a solid electrolyte-containing layer that can cause an all-solid-state secondary battery to display excellent output characteristics and cycle characteristics.

Moreover, according to the present disclosure, it is possible to provide a solid electrolyte-containing layer that can cause an all-solid-state secondary battery to display excellent output characteristics and cycle characteristics.

Furthermore, according to the present disclosure, it is possible to provide an all-solid-state secondary battery that has excellent output characteristics and cycle characteristics.

BRIEF DESCRIPTION OF THE DRAWING

In the accompanying drawing,

FIG. 1 is a cross-sectional view schematically illustrating the structure of one example of a particulate polymer contained in a presently disclosed slurry composition for an all-solid-state secondary battery.

DETAILED DESCRIPTION

The following provides a detailed description of embodiments of the present disclosure.

The presently disclosed slurry composition for an all-solid-state secondary battery is used to form a solid electrolyte-containing layer, such as an electrode mixed material layer or a solid electrolyte layer, that is used in an all-solid-state secondary battery, such as an all-solid-state lithium ion secondary battery. Moreover, in the presently disclosed all-solid-state secondary battery, at least one layer selected from the group consisting of a positive electrode mixed material layer of a positive electrode, a negative electrode mixed material layer of a negative electrode, and a solid electrolyte layer is formed of the presently disclosed solid electrolyte-containing layer, which is formed using the presently disclosed slurry composition for an all-solid-state secondary battery.

(Slurry Composition for all-Solid-State Secondary Battery)

The presently disclosed slurry composition contains a solid electrolyte, a particulate polymer, and an organic solvent and can optionally further contain one or more selected from the group consisting of an electrode active material, a conductive material, and other components. In the presently disclosed slurry composition, the particulate polymer is required to have a core-shell structure including a core portion that is formed of a polymer having a glass-transition temperature of not lower than −60° C. and not higher than −10° C. and a shell portion that is formed of a polymer having a glass-transition temperature of not lower than 15° C. and not higher than 100° C., and the amount of a nitrogen functional group-containing monomer unit in the shell polymer is required to be not less than 10 mass % and not more than 90 mass % when all repeating units of the shell polymer are taken to be 100 mass %.

The presently disclosed slurry composition can be used to form a solid electrolyte-containing layer such as an electrode mixed material layer or a solid electrolyte layer as a result of containing a solid electrolyte and also containing a particulate polymer as a binder.

Moreover, a solid electrolyte-containing layer that is formed using the presently disclosed slurry composition can cause an all-solid-state secondary battery to display excellent output characteristics and cycle characteristics. Although the reason for this is not certain, it is presumed to be as follows.

First, the particulate polymer contained in the presently disclosed slurry composition has a core-shell structure in which a core portion of the core-shell structure is formed of a polymer having a low glass-transition temperature, whereas a shell portion of the core-shell structure is formed of a polymer having a high glass-transition temperature. Consequently, when a solid electrolyte-containing layer obtained through drying of the slurry composition is pressed, the core portion is easily softened and enables sufficient densification of the solid electrolyte-containing layer even at low temperature (i.e., ensures pressability of the solid electrolyte-containing layer), whereas the shell portion is not easily softened, which means that surfaces of the solid electrolyte and the optionally used electrode active material are not excessively covered by a polymer component.

In addition, a nitrogen functional group included in the shell polymer has good adhesiveness with respect to the solid electrolyte. Therefore, the shell portion that includes a nitrogen functional group-containing monomer unit in a specific amount enables formation of a solid electrolyte-containing layer having excellent peel strength.

In other words, through the presently disclosed slurry composition, the contribution of the specific particulate polymer set forth above results in the surface of the solid electrolyte (and electrode active material) not being excessively covered by a polymer component and enables formation of a high-density solid electrolyte-containing layer having excellent peel strength. Moreover, through a solid electrolyte-containing layer having such properties, it is possible to improve output characteristics and cycle characteristics of an all-solid-state secondary battery.

Note that in a case in which the presently disclosed slurry composition is to be used to form an electrode mixed material layer (i.e., is a slurry composition for an all-solid-state secondary battery electrode), the presently disclosed slurry composition normally contains a solid electrolyte, the specific particulate polymer, an organic solvent, and an electrode active material and optionally further contains one or more selected from the group consisting of a conductive material and other components.

Also note that in a case in which the presently disclosed slurry composition is to be used to form a solid electrolyte layer (i.e., is a slurry composition for an all-solid-state secondary battery solid electrolyte layer), the presently disclosed slurry composition normally contains a solid electrolyte, the specific particulate polymer, and an organic solvent without containing an electrode active material and a conductive material, and optionally further contains other components.

<Solid Electrolyte>

The solid electrolyte may be any particles formed of a solid that displays ion conductivity without any specific limitations, and is preferably an inorganic solid electrolyte.

Examples of inorganic solid electrolytes that can be used include crystalline inorganic ion conductors, amorphous inorganic ion conductors, and mixtures thereof without any specific limitations. In a case in which the all-solid-state secondary battery is an all-solid-state lithium ion secondary battery, for example, the inorganic solid electrolyte can normally be a crystalline inorganic lithium ion conductor, an amorphous inorganic lithium ion conductor, or a mixture thereof. In particular, the inorganic solid electrolyte preferably includes either or both of a sulfide inorganic solid electrolyte and an oxide inorganic solid electrolyte from a viewpoint of forming a solid electrolyte-containing layer having excellent ion conductivity and further improving output characteristics and cycle characteristics of an all-solid-state secondary battery.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

The crystalline inorganic lithium ion conductor may be $Li_3N$, LISICON ($Li_{14}Zn(GeO_4)_4$), a perovskite-type crystalline inorganic lithium ion conductor (for example, $Li_{0.5}La_{0.5}TiO_3$), a garnet-type crystalline inorganic lithium ion conductor (for example, $Li_7La_3Zr_2O_{12}$), UPON ($Li_{3+y}PO_{4-x}N_x$), Thio-LISICON ($Li_{3.25}Ge_{0.25}P_{0.75}S_4$), an argyrodite-type crystalline inorganic lithium ion conductor ($Li_{7-x}PS_{6-x}X_x$; X is Cl, Br, or I), or the like.

One of the above-described crystalline inorganic lithium ion conductors may be used individually, or two or more of the above-described crystalline inorganic lithium ion conductors may be used as a mixture.

The amorphous inorganic lithium ion conductor may be a substance that includes a sulfur atom and displays ion conductivity, for example. More specific examples include glass Li—Si—S—O, Li—P—S, and an amorphous inorganic lithium ion conductor obtained using a raw material composition that contains $Li_2S$ and a sulfide of an element belonging to any of groups 13 to 15 of the periodic table.

The element belonging to any of groups 13 to 15 may be Al, Si, Ge, P, As, Sb, or the like, for example. Moreover, the sulfide of an element belonging to any of groups 13 to 15 may, more specifically, be $Al_2S_3$, $SiS_2$, $GeS_2$, $P_2S_3$, $P_2S_5$, $As_2S_3$, $Sb_2S_3$, or the like, for example. Furthermore, the method by which the amorphous inorganic lithium ion conductor is synthesized using the raw material composition may be an amorphization method such as mechanical milling or melt quenching, for example. The amorphous inorganic lithium ion conductor obtained using the raw material composition that contains $Li_2S$ and a sulfide of an element belonging to any of groups 13 to 15 of the periodic table is preferably $Li_2S—P_2S_5$, $Li_2S—SiS_2$, $Li_2S—GeS_2$, or $Li_2S—Al_2S_3$, and is more preferably $Li_2S—P_2S_5$.

One of the above-described amorphous inorganic lithium ion conductors may be used individually, or two or more of the above-described amorphous inorganic lithium ion conductors may be used as a mixture.

Of the examples described above, an amorphous sulfide containing Li and P or $Li_7La_3Zr_2O_{12}$ is preferable as an inorganic solid electrolyte of an all-solid-state lithium ion secondary battery from a viewpoint of forming a solid electrolyte-containing layer having even better ion conductivity and further improving output characteristics and cycle characteristics of an all-solid-state secondary battery. An amorphous sulfide containing Li and P and $Li_7La_3Zr_2O_{12}$ have high lithium ion conductivity, and thus internal resistance of a battery can be reduced and output characteristics and cycle characteristics of the battery can be improved through use thereof of as an inorganic solid electrolyte.

Note that from a viewpoint of improving output characteristics and cycle characteristics of an all-solid-state secondary battery, the amorphous sulfide containing Li and P is more preferably sulfide glass formed of $Li_2S$ and $P_2S_5$, and particularly preferably sulfide glass produced from a mixed raw material of $Li_2S$ and $P_2S_5$ in which the molar ratio of $Li_2S:P_2S_5$ is 65:35 to 85:15. Moreover, the amorphous sulfide containing Li and P is preferably sulfide glass-ceramic obtained by reacting a mixed raw material of $Li_2S$ and $P_2S_5$ in which the molar ratio of $Li_2S:P_2S_5$ is 65:35 to 85:15 by a mechanochemical method. Note that from a viewpoint of maintaining lithium ion conductivity in a high state, the molar ratio of $Li_2S:P_2S_5$ in the mixed raw material is preferably 68:32 to 80:20.

The inorganic solid electrolyte may contain one or more sulfides selected from the group consisting of $Al_2S_3$, $B_2S_3$, and $SiS_2$ as a starting material other than $Li_2S$ and $P_2S_5$ to the extent that ion conductivity is not reduced. The addition of such a sulfide can stabilize a glass component in the inorganic solid electrolyte.

Likewise, the inorganic solid electrolyte may contain one or more ortho-oxoacid lithium salts selected from the group consisting of $Li_3PO_4$, $Li_4SiO_4$, $Li_4GeO_4$, $Li_3BO_3$, and $Li_3AlO_3$, in addition to $Li_2S$ and $P_2S_5$. The inclusion of such an ortho-oxoacid lithium salt can stabilize a glass component in the inorganic solid electrolyte.

One of the above-described solid electrolytes may be used individually, or two or more of the above-described solid electrolytes may be used as a mixture. Moreover, the particle diameter of the solid electrolyte described above is not specifically limited and can be the same as that of a conventionally used solid electrolyte.

<Particulate Polymer>

The particulate polymer is a component that can function as a binder in a solid electrolyte-containing layer formed using the presently disclosed slurry composition.

<<Core-Shell Structure>>

The particulate polymer has a core-shell structure including a core portion and a shell portion covering an outer surface of the core portion. Note that the shell portion may partially cover the outer surface of the core portion or may completely cover the outer surface of the core portion.

FIG. 1 illustrates cross-sectional structure of one example of the particulate polymer. A particulate polymer 100 illustrated in FIG. 1 has a core-shell structure including a core portion 110 and a shell portion 120. The core portion 110 is a portion that is further inward than the shell portion 120 in the particulate polymer 100. The shell portion 120 is a portion that covers an outer surface 1105 of the core portion 110 and is normally an outermost portion in the particulate polymer 100. In the example illustrated in FIG. 1, the shell portion 120 completely covers the outer surface 110S of the core portion 110.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization.

In the particulate polymer having the core-shell structure, the proportion constituted by the shell portion among the total of the core portion and the shell portion when the total of mass of the core portion and mass of the shell portion is taken to be 100 mass % is preferably 10 mass % or more, more preferably 12 mass % or more, and even more preferably 14 mass % or more, and is preferably 25 mass % or less, more preferably 23 mass % or less, even more preferably 21 mass % or less, and particularly preferably 20 mass % or less. When the proportion constituted by the shell portion among the total of the core portion and the shell portion is 10 mass % or more, excessive covering of the solid electrolyte and the optionally included electrode active material by a polymer component can be sufficiently inhibited, and output characteristics of an all-solid-state secondary battery can be further improved. On the other hand, when the proportion constituted by the shell portion among the total of the core portion and the shell portion is 25 mass % or less, flexibility of the particulate polymer is sufficiently ensured, thereby increasing pressability and peel strength of a solid electrolyte-containing layer. Moreover, cycle characteristics of an all-solid-state secondary battery can be further improved.

<<Glass-Transition Temperature>>

The glass-transition temperature of the polymer forming the core portion in the particulate polymer is required to be not lower than −60° C. and not higher than −10° C., is preferably −55° C. or higher, more preferably −50° C. or higher, and even more preferably −43° C. or higher, and is preferably −15° C. or lower, more preferably −20° C. or lower, and even more preferably −32° C. or lower. When the glass-transition temperature of the core polymer is lower than −60° C., strength of the particulate polymer serving as a binder is lost, and cycle characteristics of an all-solid-state secondary battery deteriorate. On the other hand, when the glass-transition temperature of the core polymer is higher than −10° C., the particulate polymer serving as a binder becomes excessively hard, and pressability and peel strength of a solid electrolyte-containing layer are lost. Moreover, output characteristics and cycle characteristics of an all-solid-state secondary battery deteriorate.

The glass-transition temperature of the polymer forming the shell portion in the particulate polymer is required to be not lower than 15° C. and not higher than 100° C., is preferably 30° C. or higher, more preferably 39° C. or higher, and even more preferably 45° C. or higher, and is preferably 95° C. or lower, more preferably 90° C. or lower, and even more preferably 75° C. or lower. When the glass-transition temperature of the shell polymer is lower than 15° C., surfaces of the solid electrolyte and the optionally used electrode active material are excessively covered by a polymer component, resulting in deterioration of output characteristics of an all-solid-state secondary battery. On the other hand, when the glass-transition temperature of the shell polymer is higher than 100° C., peel strength of a solid electrolyte-containing layer is lost, and output characteristics and cycle characteristics of an all-solid-state secondary battery deteriorate.

Note that the glass-transition temperature of a polymer can be controlled by adjusting the types and/or amounts of monomers used to produce the polymer, for example.

<<Chemical Composition>>

[Core Portion]

The polymer forming the core portion is not specifically limited so long as the glass-transition temperature thereof is within any of the ranges set forth above but preferably includes one or more selected from the group consisting of a conjugated diene monomer unit, an alkylene structural unit, and a (meth)acrylic acid ester monomer unit, for example.

Note that in the present disclosure, "(meth)acryl" is used to indicate "acryl" and/or "methacryl".

—Conjugated Diene Monomer Unit—

Examples of conjugated diene monomers that can form a conjugated diene monomer unit in the core polymer include, but are not specifically limited to, 1,3-butadiene, 2-methyl-1,3-butadiene (isoprene), and 2,3-dimethyl-1,3-butadiene. Of these conjugated diene monomers, 1,3-butadiene is preferable. One conjugated diene monomer may be used individually, or two or more conjugated diene monomers may be used in combination in a freely selected ratio.

—Alkylene Structural Unit—

An alkylene structural unit that is optionally included in the core polymer is a repeating unit that is composed of only an alkylene structure represented by a general formula: —$C_nH_{2n}$— (n is an integer of 2 or more). Although the alkylene structural unit may be linear or branched, the alkylene structural unit is preferably linear (i.e., is preferably a linear alkylene structural unit). No specific limitations are placed on the method by which the alkylene structural unit is introduced into the polymer. For example, either of the following methods (1) or (2) may be used.

(1) A method in which a polymer is produced from a monomer composition containing a conjugated diene monomer and then this polymer is hydrogenated so as to convert a conjugated diene monomer unit to an alkylene structural unit (2) A method in which a polymer is produced from a monomer composition containing a 1-olefin monomer The conjugated diene monomer may be any of the conjugated diene monomers listed above as examples of conjugated diene monomers that can form a conjugated diene monomer unit. Of these conjugated diene monomers, 1,3-butadiene is preferable. In other words, an alkylene structural unit obtained by method (1) is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit). Selective hydrogenation of the conjugated diene monomer unit can be carried out by a commonly known method such as an oil-layer hydrogenation method or a water-layer hydrogenation method.

Moreover, the 1-olefin monomer may be ethylene, propylene, 1-butene, 1-hexene, or the like, for example. Of these 1-olefin monomers, ethylene is preferable.

One of these conjugated diene monomers or 1-olefin monomers may be used individually, or two or more of these conjugated diene monomers or 1-olefin monomers may be used in combination in a freely selected ratio.

—(Meth)Acrylic Acid Ester Monomer Unit—

Examples of (meth)acrylic acid ester monomers that can form a (meth)acrylic acid ester monomer unit in the core polymer include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Of these (meth)acrylic acid ester monomers, n-butyl acrylate, ethyl acrylate, and 2-ethylhexyl acrylate are preferable. One (meth)acrylic acid ester monomer may be used individually, or two or more (meth)acrylic acid ester monomers may be used in combination in a freely selected ratio.

The total amount of a conjugated diene monomer unit, an alkylene structural unit, and a (meth)acrylic acid ester monomer unit included in the core polymer when all repeating units of the core polymer are taken to be 100 mass % is preferably 70 mass % or more, more preferably 80 mass % or more, even more preferably 90 mass % or more, and particularly preferably 95 mass % or more, and is preferably 99.5 mass % or less. When the proportional content of the above-described repeating units in the core polymer is 70 mass % or more, pressability of a solid electrolyte-containing layer is ensured, and cycle characteristics of an all-solid-state secondary battery further improve. On the other hand, when the proportional content of the above-described repeating units in the core polymer is 99.5 mass % or less, strength of the particulate polymer serving as a binder is ensured, and cycle characteristics of an all-solid-state secondary battery further improve.

In a case in which the core polymer includes a (meth) acrylic acid ester monomer unit, for example, the amount of the (meth)acrylic acid ester monomer unit included in the core polymer when all repeating units of the core polymer are taken to be 100 mass % is preferably 70 mass % or more, more preferably 80 mass % or more, even more preferably 90 mass % or more, and particularly preferably 95 mass % or more, and is preferably 99.5 mass % or less. When the proportional content of the (meth)acrylic acid ester monomer unit in the core polymer is 70 mass % or more, pressability of a solid electrolyte-containing layer is ensured, and cycle characteristics of an all-solid-state secondary battery further improve. On the other hand, when the proportional content of the (meth)acrylic acid ester monomer unit in the core polymer is 99.5 mass % or less, strength of the particulate polymer serving as a binder is ensured, and cycle characteristics of an all-solid-state secondary battery further improve.

—Other Repeating Units—

The core polymer can include repeating units other than the above-described conjugated diene monomer unit, alkylene structural unit, and (meth)acrylic acid ester monomer unit (i.e., other repeating units). Examples of other repeating units that can be included in the core polymer include a cross-linkable monomer unit, an aromatic monovinyl monomer unit, and a nitrogen functional group-containing monomer unit. The core polymer may include one type of other repeating unit or may include two or more types of other repeating units. Moreover, the core polymer preferably includes a cross-linkable monomer unit as another repeating unit.

Examples of cross-linkable monomers that can form a cross-linkable monomer unit in the core polymer include monomers that can form a cross-linked structure through polymerization without any specific limitations. A typical example of a cross-linkable monomer is a monomer that is thermally cross-linkable. More specifically, a cross-linkable monomer that includes a thermally cross-linkable group and one olefinic double bond per molecule or a cross-linkable monomer that includes two or more olefinic double bonds per molecule may be used.

Examples of the thermally cross-linkable group include an epoxy group, an oxetanyl group, and combinations thereof. Of these thermally cross-linkable groups, an epoxy group is more preferable in terms of ease of cross-linking and cross-link density adjustment.

Examples of cross-linkable monomers that include an epoxy group as a thermally cross-linkable group and an olefinic double bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5- hexene, and 1,2-epoxy-9-decene; and glycidyl esters of unsaturated carboxylic acids such as glycidyl acrylate, glycidyl methacrylate, glycidyl crotonate, glycidyl 4-heptenoate, glycidyl sorbate, glycidyl linoleate, glycidyl 4-methyl-3-pentenoate, glycidyl ester of 3-cyclohexenecarboxylic acid, and glycidyl ester of 4-methyl-3-cyclohexenecarboxylic acid.

Examples of cross-linkable monomers that include an oxetanyl group as a thermally cross-linkable group and an olefinic double bond include 3-((meth)acryloyloxymethyl) oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Note that in the present disclosure, "(meth)acryloyl" is used to indicate "acryloyl" and/or "methacryloyl".

Examples of cross-linkable monomers including two or more olefinic double bonds per molecule include allyl (meth)acrylate, ethylene glycol di(meth)acrylate, diethylene glycol di(meth)acrylate, triethylene glycol di(meth)acrylate, tetraethylene glycol di(meth)acrylate, trimethylolpropane tri (meth)acrylate, dipropylene glycol diallyl ether, polyglycol diallyl ether, triethylene glycol divinyl ether, hydroquinone diallyl ether, tetraallyloxyethane, trimethylolpropane diallyl ether, allyl and vinyl ethers of polyfunctional alcohols other than those described above, and divinylbenzene.

Note that in the present disclosure, "(meth)acrylate" is used to indicate "acrylate" and/or "methacrylate".

One cross-linkable monomer may be used individually, or two or more cross-linkable monomers may be used in combination in a freely selected ratio. Of these cross-linkable monomers, allyl methacrylate, ethylene glycol dimethacrylate, allyl glycidyl ether, and divinylbenzene are more preferable from a viewpoint of further improving output characteristics and cycle characteristics of an all-solid-state secondary battery, with allyl methacrylate being even more preferable.

The amount of a cross-linkable monomer unit included in the core polymer when all repeating units of the core polymer are taken to be 100 mass % is preferably 0.1 mass % or more, more preferably 0.5 mass % or more, and even more preferably 0.7 mass % or more, and is preferably 5.0 mass % or less, more preferably 3.0 mass % or less, and even more preferably 1.5 mass % or less. When the proportional content of the cross-linkable monomer unit in the core polymer is within any of the ranges set forth above, pressability and peel strength of a solid electrolyte-containing layer are sufficiently ensured, and output characteristics and cycle characteristics of an all-solid-state secondary battery can be further improved.

Examples of aromatic monovinyl monomers that can form an aromatic monovinyl monomer unit in the core polymer include styrene, styrene sulfonic acid and salts thereof (for example, sodium styrenesulfonate), α-methylstyrene, vinyltoluene, and 4-(tert-butoxy)styrene. One aromatic monovinyl monomer may be used individually, or two or more aromatic monovinyl monomers may be used in combination in a freely selected ratio.

In a case in which the core polymer includes an aromatic monovinyl monomer unit, the amount of the aromatic monovinyl monomer unit included in the core polymer when all repeating units of the core polymer are taken to be 100 mass % is preferably 5 mass % or more, and more preferably 10 mass % or more, and is preferably 30 mass % or less, and more preferably 25 mass % or less.

Examples of nitrogen functional group-containing monomers that can form a nitrogen functional group-containing monomer unit in the core polymer include the same nitrogen functional group-containing monomers as those subsequently described in the "Shell portion" section. One nitrogen functional group-containing monomer may be used individually, or two or more nitrogen functional group-containing monomers may be used in combination in a freely selected ratio.

In a case in which the core polymer includes a nitrogen functional group-containing monomer unit, the amount of the nitrogen functional group-containing monomer unit included in the core polymer when all repeating units of the core polymer are taken to be 100 mass % is preferably 1 mass % or more, and more preferably 2 mass % or more, and is preferably 10 mass % or less, and more preferably 7 mass % or less.

[Shell Portion]

The polymer forming the shell portion is required to have a glass-transition temperature within the range set forth above and to include a nitrogen functional group-containing monomer unit in a proportion that is within a specific range.

—Nitrogen Functional Group-Containing Monomer Unit—

Examples of nitrogen functional group-containing monomers that can form the nitrogen functional group-containing monomer unit include any monomer that includes a nitrogen functional group such as a cyano group, an amide group, or an amino group (i.e., a functional group including a nitrogen atom) without any specific limitations. Note that the nitrogen functional group-containing monomer may include one type of nitrogen functional group or two or more types of nitrogen functional groups, and may include one nitrogen functional group or two or more nitrogen functional groups. Also note that when a given monomer includes a nitrogen functional group, that monomer is considered to correspond to a nitrogen functional group-containing monomer in the present disclosure even in a case in which the monomer also has a characteristic structure (functional group, etc.) other than the nitrogen functional group. For example, in a case in which a monomer that includes a nitrogen functional group also includes an acidic group, an epoxy group, and/or an oxetanyl group, the monomer is considered to correspond to a "nitrogen functional group-containing monomer" and not to an "acidic group-containing monomer" or a "cross-linkable monomer".

Examples of nitrogen functional group-containing monomers that may be used include cyano group-containing monomers, amide group-containing monomers, and amino group-containing monomers.

The cyano group-containing monomer may be an α,β-ethylenically unsaturated nitrile monomer. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile.

The amide group-containing monomer may be an ethylenically unsaturated monomer that includes an amide group. Specifically, the amide group-containing monomer may be N-vinylacetamide, (meth)acrylamide, N-methylol(meth) acrylamide, dimethyl(meth)acrylamide, diethyl(meth)acrylamide, hydroxyethyl(meth)acrylamide, N-methoxymethyl (meth)acrylamide, dimethylaminopropyl(meth)acrylamide, or the like.

The amino group-containing monomer may be an ethylenically unsaturated monomer that includes an amino group. Specifically, the amino group-containing monomer may be dimethylaminoethyl (meth)acrylate, diethylaminoethyl (meth)acrylate, aminoethyl vinyl ether, dimethylaminoethyl vinyl ether, or the like.

One nitrogen functional group-containing monomer may be used individually, or two or more nitrogen functional group-containing monomers may be used in combination in a freely selected ratio. Of these nitrogen functional group-containing monomers, acrylonitrile, acrylamide, methacrylamide, and dimethylaminoethyl methacrylate are preferable from a viewpoint of further improving output characteristics and cycle characteristics of an all-solid-state secondary battery.

The amount of the nitrogen functional group-containing monomer unit included in the shell polymer when all repeating units of the shell polymer are taken to be 100 mass % is required to be not less than 10 mass % and not more than 90 mass %, is preferably 20 mass % or more, more preferably 30 mass % or more, and even more preferably 39 mass % or more, and is preferably 85 mass % or less, more preferably 80 mass % or less, and even more preferably 75 mass % or less. When the proportional content of the nitrogen functional group-containing monomer unit in the shell polymer is less than 10 mass %, peel strength of a solid electrolyte-containing layer is lost due to the low number of nitrogen-containing functional groups. On the other hand, when the proportional content of the nitrogen functional group-containing monomer unit in the shell polymer is more than 90 mass %, reduction of adhesiveness of the shell polymer with respect to the electrode active material or the like is presumed to result in loss of peel strength of a solid electrolyte-containing layer. In other words, as a result of the shell polymer including the nitrogen functional group-containing monomer unit in any of the proportions set forth above, a solid electrolyte-containing layer can express good peel strength and can contribute to improving output characteristics and cycle characteristics of an all-solid-state secondary battery.

—Other Repeating Units—

The shell polymer includes repeating units other than the nitrogen functional group-containing monomer unit described above (i.e., other repeating units). Examples of other repeating units that may be included in the shell polymer include a (meth)acrylic acid ester monomer unit, a cross-linkable monomer unit, an aromatic monovinyl monomer unit, and an acidic group-containing monomer unit. Note that the shell polymer may include one type of other repeating unit or may include two or more types of other repeating units.

Moreover, the shell polymer preferably includes a (meth) acrylic acid ester monomer unit as another repeating unit.

Examples of (meth)acrylic acid ester monomers that can form a (meth)acrylic acid ester monomer unit in the shell polymer include the same (meth)acrylic acid ester monomers as those that were previously described in the "Core portion" section. Of these (meth)acrylic acid ester monomers, n-butyl acrylate is preferable. One (meth)acrylic acid ester monomer may be used individually, or two or more (meth)acrylic acid ester monomers may be used in combination in a freely selected ratio.

The amount of a (meth)acrylic acid ester monomer unit included in the shell polymer when all repeating units of the shell polymer are taken to be 100 mass % is preferably 1 mass % or more, more preferably 5 mass % or more, even more preferably 10 mass % or more, and particularly preferably 15 mass % or more, and is 90 mass % or less, preferably 70 mass % or less, more preferably 50 mass % or less, and even more preferably 45 mass % or less. When the proportional content of a (meth)acrylic acid ester in the shell polymer is within any of the ranges set forth above, pressability and peel strength of a solid electrolyte-containing layer are sufficiently ensured, and output characteristics and cycle characteristics of an all-solid-state secondary battery can be further improved.

Examples of cross-linkable monomers that can form a cross-linkable monomer unit in the shell polymer include the same cross-linkable monomers as those that were previously described in the "Core portion" section. One cross-linkable monomer may be used individually, or two or more cross-linkable monomers may be used in combination in a freely selected ratio.

In a case in which the shell polymer includes a cross-linkable monomer unit, the amount of the cross-linkable monomer unit included in the shell polymer when all repeating units of the shell polymer are taken to be 100 mass % is preferably 0.1 mass % or more, and more preferably 0.5 mass % or more, and is preferably 3 mass % or less, and more preferably 2 mass % or less.

Examples of aromatic monovinyl monomers that can form an aromatic monovinyl monomer unit in the shell polymer include the same aromatic monovinyl monomers as those that were previously described in the "Core portion" section. One aromatic monovinyl monomer may be used individually, or two or more aromatic monovinyl monomers may be used in combination in a freely selected ratio.

In a case in which the shell polymer includes an aromatic monovinyl monomer unit, the amount of the aromatic monovinyl monomer unit included in the shell polymer when all repeating units of the shell polymer are taken to be 100 mass % is preferably 5 mass % or more, and more preferably 10 mass % or more, and is preferably 50 mass % or less, and more preferably 40 mass % or less.

Examples of acidic group-containing monomers that can form an acidic group-containing monomer unit in the shell polymer include carboxy group-containing monomers, sulfo group-containing monomers, phosphate group-containing monomers, and hydroxyl group-containing monomers. One acidic group-containing monomer may be used individually, or two or more acidic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group through hydrolysis can also be used as a carboxy group-containing monomer. Of these examples, acrylic acid and methacrylic acid are preferable as carboxy group-containing monomers. One carboxy group-containing monomer may be used individually, or two or more carboxy group-containing monomers may be used in combination in a freely selected ratio.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, and 3-allyloxy-2-hydroxypropane sulfonic acid. One sulfo group-containing monomer may be used individually, or two or more sulfo group-containing monomers may be used in combination in a freely selected ratio.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate. One phosphate group-containing monomer may be used individually, or two or more phosphate group-containing monomers may be used in combination in a freely selected ratio.

Note that in the present disclosure, "(meth)acryloyl" is used to indicate "acryloyl" and/or "methacryloyl".

Examples of hydroxyl group-containing monomers include ethylenically unsaturated alcohols such as (meth) allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2{=}CR^a{-}COO{-}(C_qH_{2q}O)_p{-}H$ (where p represents an integer of 2 to 9, q represents an integer of 2 to 4, and Ra represents a hydrogen atom or a methyl group); mono(meth) acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(m eth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether. One hydroxyl group-containing monomer may be used individually, or two or more hydroxyl group-containing monomers may be used in combination in a freely selected ratio.

Although the shell polymer can include an acidic group-containing monomer unit as described above, degradation of the solid electrolyte caused by an acidic group may occur in a case in which the shell polymer includes an acidic group-containing monomer unit. Therefore, from a viewpoint of inhibiting degradation of the solid electrolyte and further improving output characteristics and cycle characteristics of an all-solid-state secondary battery, the amount of an acidic group-containing monomer unit included in the shell polymer when all repeating units of the shell polymer are taken to be 100 mass % is preferably 10 mass % or less, more preferably 5 mass % or less, even more preferably 3 mass % or less, particularly preferably 1 mass % or less, and most preferably 0 mass % (i.e., it is most preferable that the shell polymer does not include an acidic group-containing monomer unit).

[Proportion of Cross-Linkable Monomer Unit]

As previously described, the core polymer and the shell polymer forming the particulate polymer can each optionally include a cross-linkable monomer unit.

The amount of a cross-linkable monomer unit included in the particulate polymer when all repeating units of the particulate polymer are taken to be 100 mass % is preferably 0.1 mass % or more, more preferably 0.15 mass % or more, even more preferably 0.2 mass % or more, and particularly preferably 0.7 mass % or more, and is preferably less than 2.0 mass %, and more preferably 1.0 mass % or less. When the proportional content of the cross-linkable monomer unit in the particulate polymer is 0.1 mass % or more, the shape of the particulate polymer (i.e., a particulate shape) can be maintained well in the organic solvent. As a result, surfaces of the solid electrolyte and the optionally used electrode active material are not excessively covered by a polymer component in a formed solid electrolyte-containing layer, and output characteristics of an all-solid-state secondary battery further improve. On the other hand, when the proportional content of the cross-linkable monomer unit in the particulate polymer is less than 2.0 mass %, flexibility and strength of the particulate polymer are sufficiently ensured. Consequently, pressability and peel strength of a solid electrolyte-containing layer increase, and output characteristics and cycle characteristics of an all-solid-state secondary battery further improve.

<<Volume-Average Particle Diameter>>

The volume-average particle diameter of the particulate polymer is preferably 0.05 μm or more, more preferably 0.08 μm or more, and even more preferably 0.1 μm or more, and is preferably 0.8 μm or less, more preferably 0.45 μm or less, and even more preferably 0.3 μm or less. Output characteristics of an all-solid-state secondary battery further improve when the volume-average particle diameter of the particulate polymer is 0.05 μm or more, whereas peel strength of a solid electrolyte-containing layer increases and cycle characteristics of an all-solid-state secondary battery further improve when the volume-average particle diameter of the particulate polymer is 0.8 μm or less.

Note that the "volume-average particle diameter" of the particulate polymer referred to in the present disclosure can be measured by a method described in the EXAMPLES section. Also note that the volume-average particle diameter of the particulate polymer can be adjusted by, for example, altering the types and amounts of monomers used to produce the particulate polymer and/or altering the polymerization conditions (for example, the used amount of emulsifier) of the particulate polymer.

<<Production Method>>

The particulate polymer having the core-shell structure described above can be produced, for example, by stepwise polymerization in which the ratio of monomers for the core polymer and monomers for the shell polymer is changed over time. Specifically, the particulate polymer can be produced by continuous, multi-step emulsion polymerization or multi-step suspension polymerization in which a polymer of a preceding step is then covered by a polymer of a succeeding step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate (sodium lauryl sulfate), a non-ionic surfactant such as polyoxyethylene nonylphenyl ether or sorbitan monolaurate, or a cationic surfactant such as octadecylamine acetate may, for example, be used as an emulsifier in accordance with a standard method. Moreover, a peroxide such as t-butyl peroxy-2-ethylhexanoate, ammonium persulfate, potassium persulfate, or cumene peroxide or an azo compound such as 2,2'-azobis(2-methyl-N-(2-hydroxyethyl)propionamide) or 2,2'-azobis(2-amidinopropane) hydrochloride may, for example, be used as a polymerization initiator.

The polymerization procedure involves initially mixing monomers for forming the core portion and the emulsifier, and performing emulsion polymerization as one batch to obtain a particulate polymer that forms the core portion. The particulate polymer having the core-shell structure described above can then be obtained by performing polymerization of monomers for forming the shell portion in the presence of the particulate polymer forming the core portion.

When a particulate polymer in which the outer surface of a core portion is partially covered by a shell portion is to be produced, it is preferable that the monomers for forming the shell polymer are supplied into the polymerization system continuously or divided into a plurality of portions. As a result of the monomers for forming the shell polymer being supplied into the polymerization system in portions or continuously, the polymer forming the shell portion can be formed as particles that bond to the core portion such as to form a shell portion that partially covers the core portion.

<<Content>>

Although no specific limitations are placed on the amount of the particulate polymer having the core-shell structure described above that is contained in the slurry composition for an all-solid-state secondary battery, the amount thereof per 100 parts by mass of the solid electrolyte is preferably 0.1 parts by mass or more, more preferably 0.2 parts by mass or more, and even more preferably 0.5 parts by mass or more, and is preferably 10 parts by mass or less, more preferably 7.5 parts by mass or less, and even more preferably 5 parts by mass or less. A solid electrolyte-containing layer can be formed well when the amount of the particulate polymer is 0.1 parts by mass or more per 100 parts by mass of the solid electrolyte, whereas ion conductivity of a solid electrolyte-containing layer can be sufficiently ensured when the amount of the particulate polymer is 10 parts by mass or less per 100 parts by mass of the solid electrolyte. Moreover, when the amount of the particulate polymer is within any of the ranges set forth above, output characteristics and cycle characteristics of an all-solid-state secondary battery can be further improved.

<Organic Solvent>

The organic solvent is not specifically limited and may, for example, be an alicyclic hydrocarbon such as cyclopentane or cyclohexane; an aromatic hydrocarbon such as toluene, xylene, tetralin, or mesitylene; butyl butyrate; isobutyl isobutyrate; hexyl butyrate; diisobutyl ketone; n-butyl ether; or anisole. One of these organic solvents may be used individually, or two or more of these organic solvents may be used as a mixture. Of these organic solvents, xylene, butyl butyrate, isobutyl isobutyrate, hexyl butyrate, n-butyl ether, tetralin, mesitylene, and diisobutyl ketone are preferable from a viewpoint of inhibiting side reactions with the solid electrolyte and further improving output characteristics and cycle characteristics of an all-solid-state secondary battery, with xylene, butyl butyrate, isobutyl isobutyrate, and diisobutyl ketone being more preferable.

<Electrode Active Material>

The electrode active material is a material that gives and receives electrons in an electrode of an all-solid-state secondary battery. In a case in which the all-solid-state secondary battery is an all-solid-state lithium ion secondary battery, for example, the electrode active material is normally a material that can occlude and release lithium.

Although the following describes, as one example, a case in which the slurry composition for an all-solid-state secondary battery is a slurry composition for an all-solid-state lithium ion secondary battery, the presently disclosed slurry composition for an all-solid-state secondary battery is not limited to the following example.

A positive electrode active material for an all-solid-state lithium ion secondary battery may be a positive electrode active material that is formed of an inorganic compound or a positive electrode active material that is formed of an organic compound without any specific limitations. Note that the positive electrode active material may be a mixture of an inorganic compound and an organic compound.

The positive electrode active material formed of an inorganic compound may be a transition metal oxide, a complex oxide of lithium and a transition metal (lithium-containing complex metal oxide), a transition metal sulfide, or the like. The aforementioned transition metal may be Fe, Co, Ni, Mn, or the like. Specific examples of inorganic compounds that may be used in the positive electrode active material include lithium-containing complex metal oxides such as $LiCoO_2$ (lithium cobalt oxide), $LiNiO_2$, $LiMnO_2$, $LiMn_2O_4$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$. These compounds may have undergone partial element substitution.

One of the above-described positive electrode active materials formed of an inorganic compound may be used individually, or two or more of these materials may be used as a mixture.

The positive electrode active material formed of an organic compound may be a polyaniline, polypyrrole, polyacene, disulfide compound, polysulfide compound, N-fluoropyridinium salt, or the like, for example.

One of the above-described positive electrode active materials formed of an organic compound may be used individually, or two or more of these materials may be used as a mixture.

A negative electrode active material for an all-solid-state lithium ion secondary battery may be an allotrope of carbon such as graphite or coke. Note that a negative electrode active material formed of an allotrope of carbon can be used in a mixed or coated form with a metal, metal salt, oxide, or the like. Examples of negative electrode active materials that can be used also include oxides and sulfates of silicon, tin, zinc, manganese, iron, nickel, and the like; lithium metal; lithium alloys such as Li—Al, Li—Bi—Cd, and Li—Sn—Cd; lithium transition metal nitrides; and silicone.

One of the above-described negative electrode active materials may be used individually, or two or more of these materials may be used as a mixture.

<Conductive Material>

The conductive material is a material for ensuring electrical contact among the electrode active material in an electrode mixed material layer formed using the slurry composition for an all-solid-state secondary battery (slurry composition for an all-solid-state secondary battery electrode). Examples of conductive materials that may be used include conductive carbon materials such as carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber; and fibers and foils of various metals.

One of these conductive materials may be used individually, or two or more of these conductive materials may be used in combination.

The proportional content of the conductive material in the slurry composition for an all-solid-state secondary battery is preferably 0.1 parts by mass or more, and more preferably 0.5 parts by mass or more per 100 parts by mass of the electrode active material, and is preferably 10 parts by mass or less, and more preferably 7 parts by mass or less per 100 parts by mass of the electrode active material. When the amount of the conductive material is within any of the ranges set forth above, electrical contact among the electrode active material can be sufficiently ensured, and output characteristics and cycle characteristics of an all-solid-state secondary battery can be further improved.

<Other Components>

Examples of other components that can optionally be contained in the slurry composition for an all-solid-state secondary battery include dispersants, leveling agents, defoamers, reinforcing materials, and so forth. Moreover, in a case in which the all-solid-state secondary battery is an all-solid-state lithium ion secondary battery, for example, a lithium salt may be contained as another component. These other components are not specifically limited so long as they do not influence battery reactions.

Components described in JP2012-243476A, for example, can be used without any specific limitations as other components such as lithium salts, dispersants, leveling agents, defoamers, and reinforcing materials. The amounts thereof are not specifically limited and may be amounts that are described in JP2012-243476A, for example.

<Production of Slurry Composition>

The slurry composition for an all-solid-state secondary battery set forth above can be obtained by dispersing or dissolving the above-described components in the organic solvent by any mixing method, for example, but is not specifically limited to being obtained in this manner.

(Solid Electrolyte-Containing Layer)

The presently disclosed solid electrolyte-containing layer is a layer that contains a solid electrolyte. For example, the presently disclosed solid electrolyte-containing layer may be an electrode mixed material layer (positive electrode mixed material layer or negative electrode mixed material layer) that gives and receives electrons via electrochemical reactions, a solid electrolyte layer that is disposed between a positive electrode mixed material layer and a negative electrode mixed material layer that are in opposition to each other, or the like.

Moreover, the presently disclosed solid electrolyte-containing layer is a layer that is formed using the slurry composition for an all-solid-state secondary battery set forth above and can be formed by, for example, applying the slurry composition set forth above onto the surface of a suitable substrate to form a coating film and subsequently drying the coating film that is formed. In other words, the presently disclosed solid electrolyte-containing layer is formed of a dried product of the slurry composition set forth above, normally contains a solid electrolyte and a particulate polymer having a core-shell structure (and/or a polymer component derived from the particulate polymer), and can optionally further contain one or more selected from the group consisting of an electrode active material, a conductive material, and other components. Note that components contained in the solid electrolyte-containing layer are components that were contained in the slurry composition set forth above, and the content ratio of these components is normally the same as the content ratio thereof in the slurry composition.

The presently disclosed solid electrolyte-containing layer can cause an all-solid-state secondary battery to display excellent output characteristics and cycle characteristics as a result of being formed from the presently disclosed slurry composition for an all-solid-state secondary battery.

<Substrate>

No limitations are placed on the substrate onto which the slurry composition is applied. For example, a coating film of the slurry composition may be formed on the surface of a releasable substrate, this coating film may be dried to form a solid electrolyte-containing layer, and then the releasable substrate may be peeled from the solid electrolyte-containing layer. The solid electrolyte-containing layer that is peeled from the releasable substrate in this manner can be used as a free-standing film in formation of a battery member (for example, an electrode or a solid electrolyte layer) of an all-solid-state secondary battery.

Alternatively, a current collector or an electrode may be used as the substrate from a viewpoint of omitting a step of peeling the solid electrolyte-containing layer and thereby increasing production efficiency of a battery member. For example, when an electrode mixed material layer is to be produced, it is preferable that the slurry composition is applied onto a current collector that serves as a substrate.

<<Releasable Substrate>>

The releasable substrate is not specifically limited and may be a known releasable substrate such as an imide film.

<<Current Collector>>

The current collector is a material having electrical conductivity and electrochemical durability. Specifically, the current collector may, for example, be made of iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as a current collector used for a positive electrode. One of these materials may be used individually, or two or more of these materials may be used in combination in a freely selected ratio.

<<Electrode>>

The electrode (positive electrode or negative electrode) is not specifically limited and may be an electrode that is obtained by forming an electrode mixed material layer containing an electrode active material, a solid electrolyte, and a binder on a current collector such as described above.

The electrode active material, solid electrolyte, and binder that are contained in the electrode mixed material layer of the electrode are not specifically limited, and known examples thereof can be used. Note that the electrode mixed material layer of the electrode may be a layer that corresponds to the presently disclosed solid electrolyte-containing layer.

<Formation Method of Solid Electrolyte-Containing Layer>

Specific examples of methods by which the solid electrolyte-containing layer may be formed include:

(1) a method in which the presently disclosed slurry composition is applied onto the surface of a current collector or electrode (surface at the electrode mixed material layer-side in the case of an electrode; same applies below) and is then dried;

(2) a method in which a current collector or an electrode is immersed in the presently disclosed slurry composition and is then dried; and (3) a method in which the presently disclosed slurry composition is applied onto a releasable substrate and is dried to produce a solid electrolyte-containing layer that is then transferred onto the surface of an electrode.

Of these methods, methods (1) and (3) in which application and drying are performed are particularly preferable due to the ease of controlling the thickness of the solid electrolyte-containing layer.

<<Application>>

Examples of methods by which the slurry composition may be applied onto the substrate include, but are not specifically limited to, doctor blading, reverse roll coating, direct roll coating, gravure coating, extrusion coating, and brush coating.

<<Drying>>

The slurry composition on the substrate may be dried by any commonly known method without any specific limitations. Examples of drying methods that may be used include drying by warm, hot, or low-humidity air, drying in a vacuum, and drying by irradiation with infrared light, electron beams, or the like.

In a case in which the solid electrolyte-containing layer is an electrode mixed material layer, the solid electrolyte-containing layer may be subjected to a pressing process by roll pressing or the like after drying. This pressing process enables further densification of the obtained electrode mixed material layer.

<<Transfer>>

The method by which the solid electrolyte-containing layer is transferred onto the surface of an electrode or the like in method (3) may be any commonly known transfer method without any specific limitations.

(Electrode)

An electrode that is obtained by forming an electrode mixed material layer on a current collector using the presently disclosed slurry composition includes an electrode mixed material layer that contains a solid electrolyte, a particulate polymer having a core-shell structure (and/or a polymer component derived from the particulate polymer), and an electrode active material and optionally further contains one or more selected from the group consisting of a conductive material and other components. Through this electrode, it is possible to cause an all-solid-state secondary battery to display excellent output characteristics and cycle characteristics.

(Solid Electrolyte Layer)

A solid electrolyte layer that is formed using the presently disclosed slurry composition for an all-solid-state secondary battery contains a solid electrolyte and a particulate polymer having a core-shell structure (and/or a polymer component derived from the particulate polymer) and optionally further contains other components. Through this solid electrolyte layer, it is possible to cause an all-solid-state secondary battery to display excellent output characteristics and cycle characteristics.

(all-Solid-State Secondary Battery)

The presently disclosed all-solid-state secondary battery normally includes a positive electrode, a solid electrolyte layer, and a negative electrode, and a feature thereof is that at least one among a positive electrode mixed material layer of the positive electrode, a negative electrode mixed material layer of the negative electrode, and the solid electrolyte layer is the presently disclosed solid electrolyte-containing layer. In other words, the presently disclosed all-solid-state secondary battery includes at least one among: a positive electrode including a positive electrode mixed material layer formed using a slurry composition for an all-solid-state secondary battery positive electrode serving as the presently disclosed slurry composition for an all-solid-state secondary battery; a negative electrode including a negative electrode mixed material layer formed using a slurry composition for an all-solid-state secondary battery negative electrode serving as the presently disclosed slurry composition for an all-solid-state secondary battery; and a solid electrolyte layer formed using a slurry composition for an all-solid-state secondary battery solid electrolyte layer serving as the presently disclosed slurry composition for an all-solid-state secondary battery.

The presently disclosed all-solid-state secondary battery has excellent cell characteristics such as output characteristics and cycle characteristics as a result of including the presently disclosed solid electrolyte-containing layer.

Note that any electrode for an all-solid-state secondary battery including an electrode mixed material layer that does not correspond to the presently disclosed solid electrolyte-containing layer may be used without any specific limitations in the presently disclosed all-solid-state secondary battery as an electrode for an all-solid-state secondary battery including an electrode mixed material layer that does not correspond to the presently disclosed solid electrolyte-containing layer.

Moreover, any solid electrolyte layer, such as a solid electrolyte layer described in JP2012-243476A, JP2013-143299A, or JP2016-143614A, for example, may be used without any specific limitations in the presently disclosed all-solid-state secondary battery as a solid electrolyte layer that does not correspond to the presently disclosed solid electrolyte-containing layer.

The presently disclosed all-solid-state secondary battery can be obtained by stacking the positive electrode and the negative electrode such that the positive electrode mixed material layer of the positive electrode and the negative electrode mixed material layer of the negative electrode are in opposition via the solid electrolyte layer and optionally performing pressing thereof to obtain a laminate, placing the laminate in a battery container in that form or after rolling, folding, or the like in accordance with the battery shape, and then sealing the battery container. Note that an expanded metal, an overcurrent preventing device such as a fuse or a PTC device, a lead plate, or the like may be placed in the battery container as necessary in order to prevent pressure increase inside the battery and occurrence of overcharging or overdischarging. The shape of the battery may be a coin type, a button type, a sheet type, a cylinder type, a prismatic type, a flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the examples and comparative examples, the following methods were used to evaluate the glass-transition temperatures of various polymers, the volume-average particle diameter of a particulate polymer, the pressability of a positive electrode mixed material layer, the peel strength of a negative electrode mixed material layer, and the output characteristics and cycle characteristics of an all-solid-state secondary battery.

<Glass-Transition Temperature (Tg)>

In the case of a particulate polymer having a core-shell structure, water dispersions containing polymers (core polymer and shell polymer) that were to serve as measurement samples were prepared under the same polymerization conditions as for the core portion and the shell portion using the monomers, various additives, and so forth that were used in formation of the core portion and the shell portion. These water dispersions were each dried at normal temperature to obtain a measurement sample.

In the case of a particulate polymer not having a core-shell structure, a water dispersion of that particulate polymer was used as a measurement sample.

The measurement sample was weighed into an aluminum pan in an amount of 10 mg and was then measured under conditions prescribed in JIS Z 8703 by a differential scanning calorimeter (EXSTAR DSC6220 produced by SII NanoTechnology Inc.) with a measurement temperature range of −100° C. to 500° C. and a heating rate of 10° C./min so as to obtain a differential scanning calorimetry (DSC) curve. Note that an empty aluminum pan was used as a reference. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter>

The volume-average particle diameter of a particulate polymer was measured by laser diffraction. Specifically, a produced water dispersion containing the particulate polymer (adjusted to a solid content concentration of 0.1 mass %) was used as a sample. The particle diameter D50 at which, in a particle diameter distribution (by volume) measured using a laser diffraction particle diameter distribution analyzer (produced by Beckman Coulter, Inc.; product name: LS-230), cumulative volume calculated from the small diameter end of the distribution reached 50% was taken to be the volume-average particle diameter.

<Pressability>

A produced positive electrode was punched as a circular shape of 10 mm in diameter to obtain a test specimen. This test specimen was pressed with a specific pressure for 2 minutes by a uniaxial pressing machine, and the minimum pressing pressure required for the positive electrode mixed material layer to reach a target density of 3.0 g/cm$^3$ was determined. A lower pressing pressure indicates that the positive electrode mixed material layer, which is a solid electrolyte-containing layer, has better pressability.

A: Pressing pressure of less than 200 MPa
B: Pressing pressure of not less than 200 MPa and less than 300 MPa
C: Pressing pressure of not less than 300 MPa and less than 400 MPa
D: Pressing pressure of 400 MPa or more <Peel Strength>

A produced negative electrode was cut out as a rectangular shape of 1.0 cm in width by 10 cm in length to obtain a specimen. Cellophane tape (tape prescribed by JIS Z1522) was affixed to the surface at the negative electrode mixed material layer-side of the test specimen. Thereafter, the cellophane tape was peeled off from one end of the test specimen in a direction at 180° and with a speed of 50 mm/min, and the stress during this peeling was measured. Three measurements were made in this manner. An average value of the measurements was determined, was taken to be the peel strength (N/m), and was evaluated by the following standard. A larger peel strength indicates that the negative electrode mixed material layer, which is a solid electrolyte-containing layer, has better adhesiveness and has stronger close adherence to a current collector.

A: Peel strength of 3 N/m or more
B: Peel strength of not less than 2 N/m and less than 3 N/m
C: Peel strength of not less than 1 N/m and less than 2 N/m
D: Peel strength of less than 1 N/m <Output Characteristics>

Three all-solid-state secondary battery cells were charged to 4.2 V by a 0.1 C constant-current method and subsequently discharged to 3.0 V at 0.1 C in order to determine the 0.1 C discharge capacity. Next, the cells were charged to 4.2 V at 0.1 C and subsequently discharged to 3.0 V at 2 C in order to determine the 2 C discharge capacity. An average value of the 0.1 C discharge capacity for the three cells was taken to be a discharge capacity (a), an average value of the 2 C discharge capacity for the three cells was taken to be a discharge capacity (b), and a ratio (capacity ratio) of the discharge capacity (b) relative to the discharge capacity (a) was calculated (=discharge capacity (b)/discharge capacity (a)×100(%)) and was evaluated by the following standard. A larger value for the capacity ratio indicates that the all-solid-state secondary battery has better output characteristics.

A: Capacity ratio of 80% or more
B: Capacity ratio of not less than 70% and less than 80%
C: Capacity ratio of not less than 60% and less than 70%
D: Capacity ratio of less than 50%

<Cycle Characteristics>

An all-solid-state secondary battery was subjected to 50 cycles of charging and discharging at 25° C. in which the all-solid-state secondary battery was charged from 3 V to 4.2 V at 0.2 C and then discharged from 4.2 V to 3 V at 0.2 C. A ratio of the 0.2 C discharge capacity of the 50$^{th}$ cycle relative to the 0.2 C discharge capacity of the 1$^{st}$ cycle was calculated as a percentage, and this value was taken to be the capacity maintenance rate and was evaluated by the following standard. A larger value for the capacity maintenance rate indicates that there is less reduction of discharge capacity and that the all-solid-state secondary battery has better cycle characteristics.

A: Capacity maintenance rate of 90% or more
B: Capacity maintenance rate of not less than 80% and less than 90%
C: Capacity maintenance rate of not less than 70% and less than 80%
D: Capacity maintenance rate of less than 70%

Example 1

<Production of Particulate Polymer Having Core-Shell Structure>

A 1 L septum-equipped flask (reactor) including a stirrer was charged with 90 parts of deionized water and 0.5 parts of sodium lauryl sulfate as an emulsifier, the gas phase was purged with nitrogen gas, and heating was performed to 60° C. Thereafter, 0.25 parts of ammonium persulfate (APS) as a polymerization initiator was dissolved in 20.0 parts of deionized water and was added into the flask.

Meanwhile, a monomer composition was obtained in a separate vessel (emulsion vessel) by mixing 30 parts of deionized water and 0.5 parts of sodium lauryl sulfate as an emulsifier with 51.3 parts of n-butyl acrylate and 28 parts of ethyl acrylate as (meth)acrylic acid ester monomers and 0.7 parts of allyl methacrylate as a cross-linkable monomer (core monomers). The monomer composition was continuously added into the 1 L septum-equipped flask over 3 hours to perform polymerization. The reaction was carried out at 60° C. during addition. Once the addition was complete, further stirring was performed at 70° C., and, at the point at which monomer consumption reached 98%, 5 parts of n-butyl acrylate as a (meth)acrylic acid ester monomer and 15 parts of acrylonitrile as a nitrogen functional group-containing monomer (shell monomers) were mixed in the emulsion vessel to obtain a monomer composition. The monomer composition was added into the reactor over 1 hour. The reaction was carried out at 70° C. during addition. Once the addition was complete, a further 3 hours of stirring was performed at 80° C. to yield a water dispersion of a particulate polymer having a core-shell structure. This water dispersion was used to measure the volume-average particle diameter of the particulate polymer. The result is shown in Table 1. In addition, the glass-transition temperatures of the core polymer and the shell polymer were measured. The results are shown in Table 1.

<Production of Binder Composition>

An appropriate amount of xylene as an organic solvent was added to the water dispersion of the particulate polymer obtained as described above so as to obtain a mixture. The mixture was subsequently subjected to distillation under reduced pressure at 80° C. so as to remove water and excess xylene, and thereby yield a binder composition (solid content concentration: 8%).

<Production of Slurry Composition for Positive Electrode Mixed Material Layer>

After mixing 70 parts of lithium cobalt oxide (number-average particle diameter: 11.5 μm) as a positive electrode active material, 25.5 parts of sulfide glass formed of $Li_2S$ and $P_2S_5$($Li_2S/P_2S_5$=70 mol %/30 mol %; number-average particle diameter: 0.9 μm) as a solid electrolyte, 2.5 parts of acetylene black as a conductive material, and 2 parts (in terms of solid content) of the binder composition obtained as described above and further adding xylene as an organic solvent so as to adjust the solid content concentration to 80%, these materials were mixed for 60 minutes in a planetary mixer. Thereafter, further xylene was added to adjust the solid content concentration to 55%, and a further 10 minutes of mixing was subsequently performed to produce a slurry composition for a positive electrode mixed material layer.

<Production of Slurry Composition for Negative Electrode Mixed Material Layer>

After mixing 60 parts of graphite (number-average particle diameter: 20 μm) as a negative electrode active material, 36.5 parts of sulfide glass formed of $Li_2S$ and $P_2S_5$ ($Li_2S/P_2S_5$=70 mol %/30 mol %; number-average particle diameter: 0.9 μm) as a solid electrolyte, 1.5 parts of acetylene black as a conductive material, and 2.5 parts (in terms of solid content) of the binder composition obtained as described above and further adding xylene as an organic solvent so as to adjust the solid content concentration to 60%, these materials were mixed for 60 minutes in a planetary mixer. Thereafter, further xylene was added to adjust the solid content concentration to 40%, and then further mixing was performed in the planetary mixer to produce a slurry composition for a negative electrode mixed material layer.

<Production of Slurry Composition for Solid Electrolyte Layer>

After mixing 100 parts of sulfide glass formed of $Li_2S$ and $P_2S_5$ ($Li_2S/P_2S_5$=70 mol %/30 mol %; number-average particle diameter: 0.9 μm) as solid electrolyte particles and 2 parts (in terms of solid content) of the binder composition obtained as described above and further adding xylene as an organic solvent so as to adjust the solid content concentration to 60 mass % inside a glove box (moisture concentration: 0.6 mass ppm; oxygen concentration: 1.8 mass ppm) under an argon gas atmosphere, these materials were mixed for 60 minutes in a planetary mixer. Thereafter, further xylene was added to adjust the solid content concentration to 45%, and then further mixing was performed in the planetary mixer to produce a slurry composition for a solid electrolyte layer.

<Production of all-Solid-State Secondary Battery>

The slurry composition for a positive electrode mixed material layer was applied onto the surface of a current collector (aluminum foil; thickness: 20 μm) and was dried (60 minutes at temperature of 120° C.) to form a positive electrode mixed material layer (solid electrolyte-containing layer) of 50 μm in thickness and obtain a positive electrode. This positive electrode was used to evaluate pressability of the positive electrode mixed material layer. The result is shown in Table 1.

The slurry composition for a negative electrode mixed material layer was applied onto a separate current collector (copper foil; thickness: 15 μm) and was dried (60 minutes at temperature of 120° C.) to form a negative electrode mixed material layer (solid electrolyte-containing layer) of 60 μm in thickness and obtain a negative electrode. This negative electrode was used to evaluate peel strength of the negative electrode mixed material layer. The result is shown in Table 1.

Next, the slurry composition for a solid electrolyte layer was applied onto imide film (thickness: 25 μm) and was dried (60 minutes at temperature of 120° C.) to form a solid electrolyte layer (solid electrolyte-containing layer) of 150 pnm in thickness. The solid electrolyte layer on the imide film and the positive electrode were affixed such that the solid electrolyte layer and the positive electrode mixed material layer were in contact and were then subjected to a pressing process such that 400 MPa of pressure (pressing pressure) was applied in order to transfer the solid electrolyte layer onto the positive electrode mixed material layer from the imide film and thereby obtain a solid electrolyte layer-equipped positive electrode.

This solid electrolyte layer-equipped positive electrode and the negative electrode were affixed such that the solid electrolyte layer of the solid electrolyte layer-equipped positive electrode and the negative electrode mixed material layer of the negative electrode were in contact and were then subjected to a pressing process such that 400 MPa of pressure (pressing pressure) was applied to the solid electrolyte layer of the solid electrolyte layer-equipped positive electrode in order to obtain an all-solid-state secondary battery. The thickness of the solid electrolyte layer in the all-solid-state secondary battery after pressing was 120 μm.

Output characteristics and cycle characteristics were evaluated for this all-solid-state secondary battery. The results are shown in Table 1.

Examples 2, 3, and 16

A particulate polymer having a core-shell structure, a binder composition, various slurry compositions, and an all-solid-state secondary battery were prepared in the same way as in Example 1 with the exception that butyl butyrate (Example 2), diisobutyl ketone (Example 3), or isobutyl isobutyrate (Example 16) was used instead of xylene in production of the binder composition and various slurry compositions.

Various evaluations were performed in the same way as in Example 1. The results are shown in Tables 1 and 3.

Examples 4 to 8 and 10 to 15

In production of a particulate polymer having a core-shell structure, the types and amounts of core monomers and/or shell monomers were changed so as to produce a particulate polymer having a core-shell structure with a chemical composition indicated in Table 1, 2 or 3. A binder composition, various slurry compositions, and an all-solid-state secondary battery were then prepared in the same way as in Example 1 with the exception that this particulate polymer was used.

Various evaluations were performed in the same way as in Example 1. The results are shown in Tables 1 to 3.

Example 9

A particulate polymer having a core-shell structure, a binder composition, various slurry compositions, and an all-solid-state secondary battery were prepared in the same way as in Example 1 with the exception that the amount of sodium lauryl sulfate added to the reactor in production of the particulate polymer having a core-shell structure was changed from 0.5 parts to 0.2 parts.

Various evaluations were performed in the same way as in Example 1. The results are shown in Table 2.

Comparative Example 1

A binder composition, various slurry compositions, and an all-solid-state secondary battery were prepared in the same way as in Example 1 with the exception that a particulate polymer not having a core-shell structure that was produced as described below was used instead of a particulate polymer having a core-shell structure.

Various evaluations were performed in the same way as in Example 1. The results are shown in Table 4.

<Production of Particulate Polymer>

A 1 L septum-equipped flask (reactor) including a stirrer was charged with 90 parts of deionized water and 0.5 parts of sodium lauryl sulfate as an emulsifier, the gas phase was purged with nitrogen gas, and heating was performed to 60° C. Thereafter, 0.25 parts of ammonium persulfate (APS) as a polymerization initiator was dissolved in 20.0 parts of deionized water and was added into the flask.

Meanwhile, a monomer composition was obtained in a separate vessel (emulsion vessel) by mixing 30 parts of deionized water, 0.5 parts of sodium lauryl sulfate as an emulsifier, 56.3 parts of n-butyl acrylate and 28 parts of ethyl acrylate as (meth)acrylic acid ester monomers, 15 parts of acrylonitrile as a nitrogen functional group-containing monomer, and 0.7 parts of allyl methacrylate as a cross-linkable monomer. The monomer composition was continuously added into the 1 L septum-equipped flask over 3 hours to perform polymerization. The reaction was carried out at 60° C. during addition. Once the addition was complete, a further 3 hours of stirring was performed at 80° C. to yield a water dispersion of a particulate polymer not having a core-shell structure. This water dispersion was used to measure the volume-average particle diameter of the particulate polymer. The result is shown in Table 4. The glass-transition temperature of the particulate polymer was also measured. The result is shown in Table 4.

Comparative Examples 2 to 5

In production of a particulate polymer having a core-shell structure, the types and amounts of core monomers and/or shell monomers were changed so as to produce a particulate polymer having a core-shell structure with a chemical composition indicated in Table 4. A binder composition, various slurry compositions, and an all-solid-state secondary battery were then prepared in the same way as in Example 1 with the exception that this particulate polymer was used.

Various evaluations were performed in the same way as in Example 1. The results are shown in Table 4.

In Tables 1 to 4:

"BA" indicates n-butyl acrylate unit;

"EA" indicates ethyl acrylate unit;

"2EHA" indicates 2-ethylhexyl acrylate unit;

"AN" indicates acrylonitrile unit;

"ST" indicates styrene unit;

"AMA" indicates allyl methacrylate unit;

"DVB" indicates divinylbenzene unit;

"MAAm" indicates methacrylamide unit;

"DMAEM" indicates dimethylaminoethyl methacrylate unit;

"MAA" indicates methacrylic acid unit;

"DIBK" indicates diisobutyl ketone; and

"Sulfide" indicates sulfide glass ($Li_2S/P_2S_5$).

TABLE 1

| | | | | | Example 1 | Example 2 | Example 3 | Example 4 | Example 5 |
|---|---|---|---|---|---|---|---|---|---|
| Particulate polymer | | Tg of core [° C.] | | | −41 | −41 | −41 | −32 | −41 |
| | | Tg of shell [° C.] | | | 71 | 71 | 71 | 75 | 66 |
| | | Core/shell [mass ratio] | | | 0.8/0.2 | 0.8/0.2 | 0.8/0.2 | 0.8/0.2 | 0.8/0.2 |
| | Chemical composition of core [mass %] | (Meth)acrylic acid ester monomer unit | BA | Overall | 51.3 | 51.3 | 51.3 | 63.3 | 51.3 |
| | | | | In core | 64.125 | 64.125 | 64.125 | 79.125 | 64.125 |
| | | | EA | Overall | 28 | 28 | 28 | 12 | 28 |
| | | | | In core | 35 | 35 | 35 | 15 | 35 |
| | | | 2EHA | Overall | 0 | 0 | 0 | 0 | 0 |
| | | | | In core | 0 | 0 | 0 | 0 | 0 |

TABLE 1-continued

| | | | | | Example 1 | Example 2 | Example 3 | Example 4 | Example 5 |
|---|---|---|---|---|---|---|---|---|---|
| | | Nitrogen functional group-containing monomer unit | AN | Overall | 0 | 0 | 0 | 4 | 0 |
| | | | | In core | 0 | 0 | 0 | 5 | 0 |
| | | Aromatic monovinyl monomer unit | ST | Overall | 0 | 0 | 0 | 0 | 0 |
| | | | | In core | 0 | 0 | 0 | 0 | 0 |
| | | Cross-linkable monomer unit | AMA | Overall | 0.7 | 0.7 | 0.7 | 0.7 | 0.7 |
| | | | | In core | 0.875 | 0.875 | 0.875 | 0.875 | 0.875 |
| | | | DVB | Overall | 0 | 0 | 0 | 0 | 0 |
| | | | | In core | 0 | 0 | 0 | 0 | 0 |
| | Chemical composition of shell [mass %] | Nitrogen functional group-containing monomer unit | AN | Overall | 15 | 15 | 15 | 7.8 | 0 |
| | | | | In shell | 75 | 75 | 75 | 39 | 0 |
| | | | MAAm | Overall | 0 | 0 | 0 | 0 | 8 |
| | | | | In shell | 0 | 0 | 0 | 0 | 40 |
| | | | DMAEM | Overall | 0 | 0 | 0 | 0 | 0 |
| | | | | In shell | 0 | 0 | 0 | 0 | 0 |
| | | (Meth)acrylic acid ester monomer unit | BA | Overall | 5 | 5 | 5 | 5 | 5 |
| | | | | In shell | 25 | 25 | 25 | 25 | 25 |
| | | Aromatic monovinyl monomer unit | ST | Overall | 0 | 0 | 0 | 7 | 7 |
| | | | | In shell | 0 | 0 | 0 | 35 | 35 |
| | | Cross-linkable monomer unit | AMA | Overall | 0 | 0 | 0 | 0.2 | 0 |
| | | | | In shell | 0 | 0 | 0 | 1 | 0 |
| | | Acidic group-containing monomer unit | MAA | Overall | 0 | 0 | 0 | 0 | 0 |
| | | | | In shell | 0 | 0 | 0 | 0 | 0 |
| | Cross-linkable monomer unit [mass %] | | | Overall | 0.7 | 0.7 | 0.7 | 0.9 | 0.7 |
| | Volume-average particle diameter [μm] | | | | 0.15 | 0.15 | 0.15 | 0.15 | 0.15 |
| | Solid electrolyte | | | | Sulfide | Sulfide | Sulfide | Sulfide | Sulfide |
| | Organic solvent | | | | Xylene | Butyl butyrate | DIBK | Xylene | Xylene |
| | Peel strength | | | | A | A | A | A | A |
| | Pressability | | | | A | A | A | A | A |
| | Output characteristics | | | | A | A | A | A | A |
| | Cycle characteristics | | | | A | A | A | A | A |

TABLE 2

| | | | | | Example 6 | Example 7 | Example 8 | Example 9 | Example 10 |
|---|---|---|---|---|---|---|---|---|---|
| Particulate polymer | Tg of core [° C.] | | | | −41 | −41 | −41 | −41 | −38 |
| | Tg of shell [° C.] | | | | 39 | 71 | 71 | 71 | 71 |
| | Core/shell [mass ratio] | | | | 0.8/0.2 | 0.75/0.25 | 0.9/0.1 | 0.8/0.2 | 0.8/0.2 |
| | Chemical composition of core [mass %] | (Meth)acrylic acid ester monomer unit | BA | Overall | 51.3 | 48.1 | 57.7 | 51.3 | 50.8 |
| | | | | In core | 64.125 | 64.133 | 64.111 | 64.125 | 63.5 |
| | | | EA | Overall | 28 | 26.2 | 31.5 | 28 | 28 |
| | | | | In core | 35 | 34.933 | 35 | 35 | 35 |
| | | | 2EHA | Overall | 0 | 0 | 0 | 0 | 0 |
| | | | | In core | 0 | 0 | 0 | 0 | 0 |
| | | Nitrogen functional group-containing monomer unit | AN | Overall | 0 | 0 | 0 | 0 | 0 |
| | | | | In core | 0 | 0 | 0 | 0 | 0 |
| | | Aromatic monovinyl monomer unit | ST | Overall | 0 | 0 | 0 | 0 | 0 |
| | | | | In core | 0 | 0 | 0 | 0 | 0 |
| | | Cross-linkable monomer unit | AMA | Overall | 0.7 | 0.7 | 0.8 | 0.7 | 1.2 |
| | | | | In core | 0.875 | 0.933 | 0.889 | 0.875 | 1.5 |
| | | | DVB | Overall | 0 | 0 | 0 | 0 | 0 |
| | | | | In core | 0 | 0 | 0 | 0 | 0 |
| | Chemical composition of shell [mass %] | Nitrogen functional group-containing monomer unit | AN | Overall | 0 | 18.8 | 7.5 | 15 | 15 |
| | | | | In shell | 0 | 75.2 | 75 | 75 | 75 |
| | | | MAAm | Overall | 0 | 0 | 0 | 0 | 0 |
| | | | | In shell | 0 | 0 | 0 | 0 | 0 |
| | | | DMAEM | Overall | 7 | 0 | 0 | 0 | 0 |
| | | | | In shell | 35 | 0 | 0 | 0 | 0 |
| | | (Meth)acrylic acid ester monomer unit | BA | Overall | 5 | 6.2 | 2.5 | 5 | 5 |
| | | | | In shell | 25 | 24.8 | 25 | 25 | 25 |
| | | Aromatic monovinyl monomer unit | ST | Overall | 8 | 0 | 0 | 0 | 0 |
| | | | | In shell | 40 | 0 | 0 | 0 | 0 |
| | | Cross-linkable monomer unit | AMA | Overall | 0 | 0 | 0 | 0 | 0 |
| | | | | In shell | 0 | 0 | 0 | 0 | 0 |
| | | Acidic group-containing monomer unit | MAA | Overall | 0 | 0 | 0 | 0 | 0 |
| | | | | In shell | 0 | 0 | 0 | 0 | 0 |
| | Cross-linkable monomer unit [mass %] | | | Overall | 0.7 | 0.7 | 0.8 | 0.7 | 1.2 |
| | Volume-average particle diameter [μm] | | | | 0.15 | 0.15 | 0.15 | 0.35 | 0.15 |
| | Solid electrolyte | | | | Sulfide | Sulfide | Sulfide | Sulfide | Sulfide |
| | Organic solvent | | | | Xylene | Xylene | Xylene | Xylene | Xylene |
| | Peel strength | | | | A | B | A | B | B |
| | Pressability | | | | A | B | A | A | B |

TABLE 2-continued

| | Example 6 | Example 7 | Example 8 | Example 9 | Example 10 |
|---|---|---|---|---|---|
| Output characteristics | A | A | B | A | B |
| Cycle characteristics | A | B | A | B | B |

TABLE 3

| | | | | | Example 11 | Example 12 | Example 13 | Example 14 | Example 15 | Example 16 |
|---|---|---|---|---|---|---|---|---|---|---|
| Particulate polymer | | Tg of core [° C.] | | | −40 | −43 | −14 | −41 | −41 | −41 |
| | | Tg of shell [° C.] | | | 71 | 71 | 71 | 30 | 80 | 71 |
| | | Core/shell [mass ratio] | | | 0.8/0.2 | 0.8/0.2 | 0.8/0.2 | 0.8/0.2 | 0.8/0.2 | 0.8/0.2 |
| | Chemical composition of core [mass %] | (Meth)acrylic acid ester monomer unit | BA | Overall | 51 | 0 | 39.3 | 51.3 | 51.3 | 51.3 |
| | | | | In core | 63.75 | 0 | 49.125 | 64.125 | 64.125 | 64.125 |
| | | | EA | Overall | 28 | 28 | 26.4 | 28 | 28 | 28 |
| | | | | In core | 35 | 35 | 33 | 35 | 35 | 35 |
| | | | 2EHA | Overall | 0 | 51.3 | 0 | 0 | 0 | 0 |
| | | | | In core | 0 | 64.125 | 0 | 0 | 0 | 0 |
| | | Nitrogen functional group-containing monomer unit | AN | Overall | 0 | 0 | 0 | 0 | 0 | 0 |
| | | | | In core | 0 | 0 | 0 | 0 | 0 | 0 |
| | | Aromatic monovinyl monomer unit | ST | Overall | 0 | 0 | 13.6 | 0 | 0 | 0 |
| | | | | In core | 0 | 0 | 17 | 0 | 0 | 0 |
| | | Cross-linkable monomer unit | AMA | Overall | 0 | 0.7 | 0.7 | 0.7 | 0.7 | 0.7 |
| | | | | In core | 0 | 0.875 | 0.875 | 0.875 | 0.875 | 0.875 |
| | | | DVB | Overall | 1 | 0 | 0 | 0 | 0 | 0 |
| | | | | In core | 1.25 | 0 | 0 | 0 | 0 | 0 |
| | Chemical composition of shell [mass %] | Nitrogen functional group-containing monomer unit | AN | Overall | 15 | 15 | 15 | 4 | 14.4 | 15 |
| | | | | In shell | 75 | 75 | 75 | 20 | 72 | 75 |
| | | | MAAm | Overall | 0 | 0 | 0 | 0 | 0 | 0 |
| | | | | In shell | 0 | 0 | 0 | 0 | 0 | 0 |
| | | | DMAEM | Overall | 0 | 0 | 0 | 0 | 0 | 0 |
| | | | | In shell | 0 | 0 | 0 | 0 | 0 | 0 |
| | | (Meth)acrylic acid ester monomer unit | BA | Overall | 5 | 5 | 5 | 13 | 5 | 5 |
| | | | | In shell | 25 | 25 | 25 | 65 | 25 | 25 |
| | | Aromatic monovinyl monomer unit | ST | Overall | 0 | 0 | 0 | 3 | 0 | 0 |
| | | | | In shell | 0 | 0 | 0 | 15 | 0 | 0 |
| | | Cross-linkable monomer unit | AMA | Overall | 0 | 0 | 0 | 0 | 0 | 0 |
| | | | | In shell | 0 | 0 | 0 | 0 | 0 | 0 |
| | | Acidic group-containing monomer unit | MAA | Overall | 0 | 0 | 0 | 0 | 0.6 | 0 |
| | | | | In shell | 0 | 0 | 0 | 0 | 3 | 0 |
| | | Cross-linkable monomer unit [mass %] | | Overall | 1 | 0.7 | 0.7 | 0.7 | 0.7 | 0.7 |
| | | Volume-average particle diameter [μm] | | | 0.15 | 0.15 | 0.15 | 0.15 | 0.35 | 0.15 |
| | | Solid electrolyte | | | Sulfide | Sulfide | Sulfide | Sulfide | Sulfide | Sulfide |
| | | Organic solvent | | | Xylene | Xylene | Xylene | Xylene | Xylene | Isobutyl isobutyrate |
| | | Peel strength | | | A | A | A | B | A | A |
| | | Pressability | | | A | A | B | A | A | A |
| | | Output characteristics | | | A | A | A | B | B | A |

TABLE 4

| | | | | | Comparative Example 1 | Comparative Example 2 | Comparative Example 3 | Comparative Example 4 | Comparative Example 5 |
|---|---|---|---|---|---|---|---|---|---|
| Particulate polymer | | Tg of core [° C.] | | | −5 | 11 | −41 | −41 | −41 |
| | | Tg of shell [° C.] | | | | 71 | 2 | 71 | 71 |
| | | Core/shell [mass ratio] | | | — | 0.8/0.2 | 0.8/0.2 | 0.8/0.2 | 0.8/0.2 |
| | Chemical composition of core [mass %] | (Meth)acrylic acid ester monomer unit | BA | Overall | 56.3 | 27.3 | 51.3 | 51.3 | 51.3 |
| | | | | In core | 56.3 | 34.125 | 64.125 | 64.125 | 64.125 |
| | | | EA | Overall | 28 | 16 | 28 | 28 | 28 |
| | | | | In core | 28 | 20 | 35 | 35 | 35 |
| | | | 2EHA | Overall | 0 | 0 | 0 | 0 | 0 |
| | | | | In core | 0 | 0 | 0 | 0 | 0 |
| | | Nitrogen functional group-containing monomer unit | AN | Overall | 15 | 0 | 0 | 0 | 0 |
| | | | | In core | 15 | 0 | 0 | 0 | 0 |
| | | Aromatic monovinyl monomer unit | ST | Overall | 0 | 36 | 0 | 0 | 0 |
| | | | | In core | 0 | 45 | 0 | 0 | 0 |
| | | Cross-linkable monomer unit | AMA | Overall | 0.7 | 0.7 | 0.7 | 0.7 | 0.7 |
| | | | | In core | 0.7 | 0.875 | 0.875 | 0.875 | 0.875 |
| | | | DVB | Overall | 0 | 0 | 0 | 0 | 0 |
| | | | | In core | 0 | 0 | 0 | 0 | 0 |

TABLE 4-continued

| | | | | Comparative Example 1 | Comparative Example 2 | Comparative Example 3 | Comparative Example 4 | Comparative Example 5 |
|---|---|---|---|---|---|---|---|---|
| Chemical composition of shell [mass %] | Nitrogen functional group-containing monomer unit | AN | Overall | | 15 | 4 | 1 | 19 |
| | | | In shell | | 75 | 20 | 5 | 95 |
| | | MAAm | Overall | | 0 | 0 | 0 | 0 |
| | | | In shell | | 0 | 0 | 0 | 0 |
| | | DMAEM | Overall | | 0 | 0 | 0 | 0 |
| | | | In shell | | 0 | 0 | 0 | 0 |
| | (Meth)acrylic acid ester monomer unit | BA | Overall | | 5 | 16 | 5 | 1 |
| | | | In shell | | 25 | 80 | 25 | 5 |
| | Aromatic monovinyl monomer unit | ST | Overall | | 0 | 0 | 14 | 0 |
| | | | In shell | | 0 | 0 | 70 | 0 |
| | Cross-linkable monomer unit | AMA | Overall | | 0 | 0 | 0 | 0 |
| | | | In shell | | 0 | 0 | 0 | 0 |
| | Acidic group-containing monomer unit | MAA | Overall | | 0 | 0 | 0 | 0 |
| | | | In shell | | 0 | 0 | 0 | 0 |
| Cross-linkable monomer unit [mass %] | | | Overall | 0.7 | 0.7 | 0.7 | 0.7 | 0.7 |
| Volume-average particle diameter [μm] | | | | 0.15 | 0.15 | 0.15 | 0.15 | 0.15 |
| Solid electrolyte | | | | Sulfide | Sulfide | Sulfide | Sulfide | Sulfide |
| Organic solvent | | | | Xylene | Xylene | Xylene | Xylene | Xylene |
| Peel strength | | | | D | C | D | D | D |
| Pressability | | | | D | D | D | D | D |
| Output characteristics | | | | D | C | C | D | D |
| Cycle characteristics | | | | D | D | D | D | D |

It can be seen from Tables 1 to 3 that an all-solid-state secondary battery displayed excellent output characteristics and cycle characteristics in Examples 1 to 16. It can also be seen that a solid electrolyte-containing layer had excellent pressability and peel strength in Examples 1 to 16.

In contrast, it can be seen from Table 4 that pressability and peel strength of a solid electrolyte-containing layer decreased and that output characteristics and cycle characteristics of an all-solid-state secondary battery were lost in each of Comparative Example 1 in which a particulate polymer not having a core-shell structure was used, Comparative Example 2 in which the glass-transition temperature of a core polymer exceeded a specific upper limit, Comparative Example 3 in which the glass-transition temperature of a shell polymer fell below a specific lower limit, Comparative Example 4 in which the proportional content of a nitrogen functional group-containing monomer unit in a shell polymer fell below a specific lower limit, and Comparative Example 5 in which the proportional content of a nitrogen functional group-containing monomer unit in a shell polymer exceeded a specific upper limit.

INDUSTRIAL APPLICABILITY

According to the present disclosure, it is possible to provide a slurry composition for an all-solid-state secondary battery with which it is possible to form a solid electrolyte-containing layer that can cause an all-solid-state secondary battery to display excellent output characteristics and cycle characteristics.

Moreover, according to the present disclosure, it is possible to provide a solid electrolyte-containing layer that can cause an all-solid-state secondary battery to display excellent output characteristics and cycle characteristics.

Furthermore, according to the present disclosure, it is possible to provide an all-solid-state secondary battery that has excellent output characteristics and cycle characteristics.

REFERENCE SIGNS LIST

100 particulate polymer
110 core portion
110S outer surface of core portion
120 shell portion

The invention claimed is:

1. A slurry composition for an all-solid-state secondary battery comprising a solid electrolyte, a particulate polymer, and an organic solvent, wherein the particulate polymer has a core-shell structure including a core portion and a shell portion at least partially covering an outer surface of the core portion, a polymer forming the core portion has a glass-transition temperature of not lower than −60° C. and not higher than −10° C., a polymer forming the shell portion has a glass-transition temperature of not lower than 15° C. and not higher than 100° C., the polymer forming the shell portion includes a nitrogen functional group-containing monomer unit, and the nitrogen functional group-containing monomer unit is included in the polymer forming the shell portion in an amount of not less than 10 mass % and not more than 90 mass % when all repeating units of the polymer forming the shell portion are taken to be 100 mass %, the particulate polymer includes a cross-linkable monomer unit, and the cross-linkable monomer unit is included in the particulate polymer in an amount of not less than 0.1 mass % and less than 2.0 mass % when all repeating units of the particulate polymer are taken to be 100 mass %, and the polymer forming the core portion includes the cross-linkable monomer unit in an amount of not less than 0.7 mass % and not more than 3.0 mass % when all repeating units of the polymer forming the core portion are taken to be 100 mass %.

2. The slurry composition for an all-solid-state secondary battery according to claim 1, wherein the shell portion constitutes a proportion of not less than 10 mass % and not more than 25 mass % among a total of the core portion and the shell portion.

3. The slurry composition for an all-solid-state secondary battery according to claim 1, further comprising an electrode active material.

4. The slurry composition for an all-solid-state secondary battery according to claim 3, further comprising a conductive material.

5. A solid electrolyte-containing layer formed using the slurry composition for an all-solid-state secondary battery according to claim 1.

6. An all-solid-state secondary battery comprising the solid electrolyte-containing layer according to claim 5.

7. The slurry composition for an all-solid-state secondary battery according to claim 1, wherein the cross-linkable monomer unit is included in the particulate polymer in an amount of not less than 0.7 mass % and less than 2.0 mass % when all repeating units of the particulate polymer are taken to be 100 mass %.

* * * * *